(12) United States Patent
Maiti et al.

(10) Patent No.: US 9,908,790 B2
(45) Date of Patent: Mar. 6, 2018

(54) HOUSEHOLD SOLAR STILL WITH EASY OPERATION AND MAINTENANCE AND ENHANCED OUTPUT

(71) Applicant: Council of Scientific & Industrial Research, Rafi Marg, New Delhi (IN)

(72) Inventors: Subarna Maiti, Gujarat (IN); Pankaj Arvindbhai Patel, Gujarat (IN); Chitrangi BankimBhai Bhatt, Gujarat (IN); Jitendra Narsinhbhai Bharadia, Gujarat (IN); Mahesh Ramjibhai Gajjar, Gujarat (IN); Pratap Sashikant Bapat, Gujarat (IN); Pushpito Kumar Ghosh, Gujarat (IN)

(73) Assignee: COUNCIL OF SCIENTIFIC & INDUSTRIAL RESEARCH, New Dehli (IN)

( * ) Notice: Subject to any disclaimer, the term of this patent is extended or adjusted under 35 U.S.C. 154(b) by 654 days.

(21) Appl. No.: 14/382,534

(22) PCT Filed: Mar. 4, 2013

(86) PCT No.: PCT/IN2013/000122
§ 371 (c)(1),
(2) Date: Sep. 2, 2014

(87) PCT Pub. No.: WO2013/128473
PCT Pub. Date: Sep. 6, 2013

(65) Prior Publication Data
US 2015/0107983 A1 Apr. 23, 2015

(30) Foreign Application Priority Data
Mar. 2, 2012 (IN) .............................. 599/DEL/2012

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0035* (2013.01); *B01D 1/0082* (2013.01);
(Continued)

(58) Field of Classification Search
CPC ...... C02F 1/14; C02F 2103/08; B01D 1/0082; B01D 1/0035; F24J 2/523; F24J 2/10; F24J 2/04
See application file for complete search history.

(56) References Cited

U.S. PATENT DOCUMENTS 4,209,363 A * 6/1980 Ramer ...................... C02F 1/14
202/172
4,270,981 A 6/1981 Stark
(Continued)

FOREIGN PATENT DOCUMENTS

DE 38 29 464 A1 3/1990
DE 10 2007 055448 A1 5/2009
(Continued)

OTHER PUBLICATIONS

Ei-Sebaii, A. A., Ramadan, M. R. I., Aboul-Enein, S., & Salem, N. (2008). Thermal performance of a single-basin solar still integrated with a shallow solar pond. Energy conversion and Management, 49(10), 2839-2848.*
(Continued)

*Primary Examiner* — In Suk C Bullock
*Assistant Examiner* — Youngsul Jeong
(74) *Attorney, Agent, or Firm* — Knobbe, Martens, Olson & Bear, LLP

(57) ABSTRACT

The invention discloses the design of an improved household solar still with enhanced output and high recovery. The
(Continued)

output and recovery are enhanced by (i) aligning the top glass and basin so as to maximize the input solar radiation, (ii) using North-South reflectors in V trough configuration to further raise the incident radiation, (iii) employing metallic condensers on sides to maximize condensation efficiency, (iv) using suitably heated and cooled saline water by taking advantage of ambient temperature differential during a day and using such water as feed water and condenser water respectively. Use of detachable top glass assembly and teflon cork at the bottom allows for easy cleaning of the interior of the still and discharge of concentrate, respectively. The still is also demonstrated to be useful for other applications where, besides producing distilled water, the concentrate is a more value added product than the feed.

7 Claims, 11 Drawing Sheets

(51) Int. Cl.
  *F24J 2/16* (2006.01)
  *F24J 2/52* (2006.01)
  *C02F 103/08* (2006.01)

(52) U.S. Cl.
  CPC .............. *C02F 2103/08* (2013.01); *F24J 2/16* (2013.01); *F24J 2/523* (2013.01); *Y02W 10/37* (2015.05)

(56) References Cited

U.S. PATENT DOCUMENTS

| | | | | |
|---|---|---|---|---|
| 4,420,375 A | * | 12/1983 | Husson | C02F 1/14 |
| | | | | 202/234 |
| 6,821,395 B1 | * | 11/2004 | Ward | C02F 1/14 |
| | | | | 159/903 |
| 2003/0057084 A1 | * | 3/2003 | Ludwig | B01D 5/0066 |
| | | | | 202/234 |
| 2012/0234667 A1 | * | 9/2012 | Coots | B01D 1/0035 |
| | | | | 203/10 |

FOREIGN PATENT DOCUMENTS

| | | | | |
|---|---|---|---|---|
| DE | 102007055448 A1 | * | 5/2009 | .......... B01D 1/0035 |
| WO | WO 2008/003342 A1 | | 1/2008 | |
| WO | WO 2011/160654 A1 | | 12/2011 | |
| WO | WO 2012156768 A1 | * | 11/2012 | .............. F26B 3/286 |

OTHER PUBLICATIONS

Arunkumar, T., Ahsan, A., Vinothkumar, K., Jayaprakash, R., & Kumar, S. (2012). Experimental study on a compound parabolic concentrator tubular solar still tied with pyramid solar still. INTECH Open Access Publisher.*
Nafey, A. S., Abdelkader, M., Abdelmotalip, A., & Mabrouk, A. A. (2000). Parameters affecting solar still productivity. Energy conversion and management, 41(16), 1797-1809.*
Sangani, C. S., & Solanki, C. S. (2007). Experimental evaluation of V-trough (2 suns) PV concentrator system using commercial PV modules. Solar Energy Materials and Solar Cells, 91(6), 453-459.*
Davis, J. R., & ASM International. (2010). Stainless steels. Materials Park, Ohio: ASM International. p. 490. Google Books.*
El-Bahi et al. (A solar still with minimum inclination, coupled to an outside condenser. 1999, Desalination, 123(1), 79-83.*
Antrim (Solar hot water. 2006, Appropedia.com, http://www.appropedia.org/Solar_hot_water).*

* cited by examiner

HOUSEHOLD SOLAR STILL WITH EASY OPERATION AND MAINTENANCE AND ENHANCED OUTPUT

FIELD OF THE INVENTION

The present invention relates to an improved design of a household solar distillation unit for drinking water production. More particularly, the invention relates to a solar distillation unit or solar still with enhanced solar radiation incident on the top glass cover with the use of reflectors on the north & south sides. Still more particularly, the invention relates to attainment of a higher productivity than a conventional solar still through the use of side metallic condensers and also raising the overall efficiency of the unit by better condensation and evaporation techniques.

BACKGROUND AND PRIOR ART OF THE INVENTION

Reference may be made to the article "A portable single-basin solar still with an external reflecting booster and an outside condenser" published in Desalination 280 (2011) 332-338, by Monowe et. al, which describes design of a portable thermal-electrical solar still with an external reflecting booster and an outside condenser. The main aim of the paper is to recover the heat from condensation of vapors. The approach is less relevant to Indian climatic conditions, especially during summer months, besides the fact that electrical energy is also required to operate a fan connected to the condenser.

Reference may be made to a paper by Velmurugan et. al. entitled "Productivity enhancement of stepped solar still-Performance analysis", published in Thermal Science Vol. 12 (2008), No. 3, pp. 153-163, where theoretical and experimental analysis were made for fin type, sponge type, and combination of fin and sponge type stepped solar still.

Reference may be made to a paper by Shanmugan et. al. entitled "Performance study on an acrylic mirror boosted solar distillation unit utilizing seawater", published in Desalination 230 (2008) 281-287, where the performance of solar still in terms of collection of distilled water have been analyzed and a booster mirror (acrylic) is attached with just above the glass cover of solar still. The reported result with this boosted distillation unit was 4.2 L/m$^2$/d at 890 W/m$^2$ max.

Reference may be made to an article, "Monthly optimum inclination of glass cover and external reflector of a basin type solar still with internal and external reflector" published in Solar Energy 84(2010) 1959-1966, which reports a theoretical analysis of a basin type solar still with internal and external reflectors. Theoretically predicted distillate produced by the still throughout the year, varies according to the inclination angle of both the glass cover and the external reflector. No experimental work has been carried out in this paper.

Reference may be made to US 7008515B1 dated Mar. 7, 2006 wherein a solar still is described with improved enclosure and evaporation assembly. The evaporation assembly floats on a body of source water and is readily collapsed and folded for storage or transport. The enclosure assembly includes a transparent conical dome covering a collection reservoir and an inner float ring. The evaporation assembly is placed in the center of the inner float ring. During operation, solar radiation causes water to evaporate from the evaporation assembly. The water vapor is then condensed and collected by the enclosure assembly. No mention is made of the use of improved condenser assembly for enhancement of daily productivity.

Reference may be made to Indian Patent Application No. 1550/DEL/2009 dated 27th July by Maiti et al. wherein PV panel assemblies having high aspect ratio are fitted with N-S reflectors in V-trough to raise the insolation on the panel and, consequently, the derived electrical power. No mention is made therein of the use of such reflector assemblies on the solar still.

Reference may be made to U.S. Pat. No. 5,053,110A dated Oct. 1, 1991 wherein a solar still described consists of an evaporating collector dome which is provided with a smooth interior surface to permit collection of distillate. The apparatus exterior is provided with a black surface to serve as a black body and so absorb increased amounts of the sun's energy. Additionally, that same exterior is coated with a film of infra-red absorbing material to further increase solar-energy absorption. To further improve the system's efficiency, various external tubing designs are utilized to preheat the load prior to its entry into the evaporating chamber. The invention does not mention the presence of condensers to enhance condensation efficiency.

Reference may be made to U.S. Pat. No. 4,406,749A dated Sep. 27, 1983 wherein a solar still is described in which the water to be distilled is confined within an internal chamber and subjected to solar energy through a transparent lid. The water that is distilled collects on the interior surface of the lid. The lid is located at an inclined position with respect to gravity. The droplets of distilled water which adhere to the interior surface of the lid flow to the lowest elevation of the lid. These accumulated droplets of distilled water are to be removed and collected within a collecting container. A water inlet valve assembly is connected to supply water within the internal chamber. No mention is made to the use of side condensers and north-south reflectors for enhancement of daily productivity.

Reference may be made to a paper by F. F. Tabrizi et al. entitled "Effect of water flow rate on internal heat and mass transfer and daily productivity of a weir-type cascade solar still" published in Desalination 260(2010) 239-247 which reports the construction of a cascade solar still (CSS) designed for water purification with a view of enhancing the daily productivity. The results showed a decrease in the internal heat and mass transfer rates as well as daily productivity with an increase in water flow rate. No mention is made to the use of side condensers for enhancement of daily productivity.

Reference may be made to the work by H. S. Kwatra in the article, "Performance of a solar still: Predicted effect of enhanced evaporation area on yield and evaporation temperature" published in Solar Energy 56(1996) 261-266. The work describes a solar still with enlarged evaporation area and computer simulation in order to explore the quantitative relationship between evaporation area and the distillation yield. The article does not report any experimental study.

Reference may be made to a solar still by A. E. Kabeel, A. Khalil, Z. M. Omara, M. M. Younes in the paper "Theoretical and experimental parametric study of modified stepped solar still" published in Desalination, Volume 289, 15 Mar. 2012, Pages 12-20. In this work an experimental as well as theoretical investigation was carried out. Two solar stills are used simultaneously and both used saline water; a conventional single sloped solar still and a modified stepped solar still. The influence of depth and width of trays on the performance of the stepped solar still was investigated. The results showed that the productivity of the stepped solar still strongly depended on the tray depth and width. This article does not disclose use of reflectors or side condensers for enhanced productivity. Reference may be made to an article by K. Vinoth Kumar & R. Kasturi Bai entitled "Performance study on solar still with enhanced condensation" published in Desalination, Volume 230, Issues 1-3, 30 Sep. 2008, Pages 51-61. In this article, a basin type solar still (0.5 m$^2$) with improved condensation technique was designed and built, and a performance study was carried out with different samples such as tap water, seawater and dairy industry effluent. The condensation occurred due to the temperature difference on the glass surface and on the four sidewalls, which could be cooled by water circulation through tubes attached on the wall surface for efficiency enhancement. The maximum daily production of the solar still was about 1.4 L/m$^2$·d, and its efficiency was about 30%. The productivity from this still is lower compared to that reported in this patent and also, the use of reflectors is not mentioned.

Reference may be made to an example cited in an article by J. T. Mandi, B. E. Smith & A. O. Sharif, entitled "An experimental wick-type solar still system: Design and construction" published in Desalination, Volume 267, Issues 2-3, 15 Feb. 2011, Pages 233-238. In this work a tilted wick-type solar still was designed and constructed. Charcoal cloth was used as an absorber/evaporator material and for saline water transport. The article does not address general maintenance.

OBJECTS OF THE INVENTION

The main object of the invention is to improve over the prior art and maximize the product water output from a solar still under Indian climatic conditions.

Another object is to desalinate seawater which is otherwise difficult on small scale with popular technologies such as RO.

Another object is to treat the seawater with alum and charcoal as required to minimize turbidity and odour.

Another object is to make use of V-trough alignment of reflectors to maximize the incident radiation falling on the still while keeping the operation simple.

Another object is to have the top glass cover and the basin both tilted at the near latitude angle to maximize the capture of solar radiation.

Another object is to introduce partitions on the basin to maintain the water too in tilted position without allowing it to roll down.

Another object is to use black ink/pigment to maximize absorption of radiation.

Another object is to provide condensers along the sides to aid the condensation of vapors especially during summer months when the need for drinking water is most severely felt.

Another object is to minimize heating of the condensers by the incident radiation.

Another object is to flow seawater or other available feed water over the condensers after allowing such water to attain the lowest ambient temperature through night sky radiation and thereafter quickly filling it into an insulated tank where it remains cool even under hot ambient conditions.

Another object is to heat up the next day's feed water and put it into a separate tank where it is kept warm.

Another object is to use a detachable top glass assembly and teflon corks at the bottom of the basin for easy cleaning of the basin in case of formation of hard scales.

Yet another object of the invention is to achieve the desired results in cost-effective manner.

Yet another object is to make the unit user friendly for greater rural community acceptance.

SUMMARY OF THE INVENTION

Figure 1:
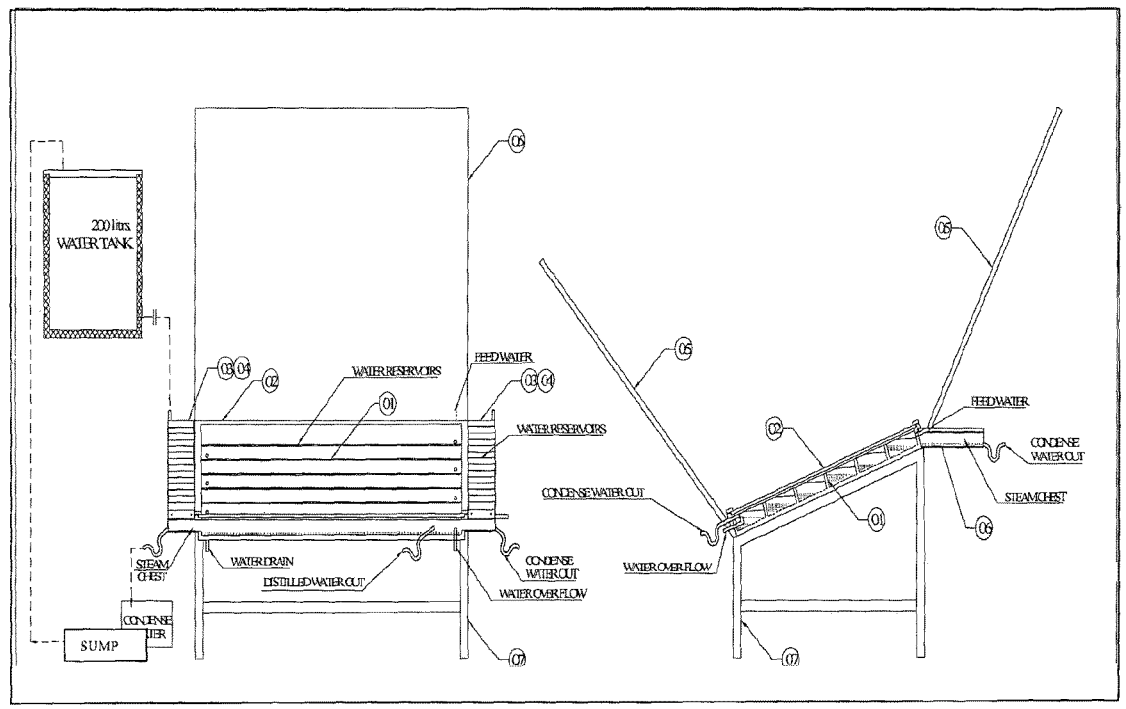
FIG. 1 represents the overall solar still assembly with condensers, reflectors.

Accordingly, present invention provides an improved household solar still for desalination of brackish and seawater with enhanced recovery and output, comprises a top glass assembly (02) fixed to a teakwood frame positioned on solar still over a rubber gasket strip and providing a water basin (01) with 5-partitions, reflectors (05) made of anodized aluminium sheets, attached to a PVC sheet fixed on the north-south edges of the still and metallic side condensers (03), and (06) being attached on both sides and back side of the said still. (04) represents the condenser cover above the side condensers (03).

In an embodiment of the present invention, the top glass and water basin are tilted at an angle in the range of 18.9 to 20° to the horizontal with the top pointing northwards and the bottom pointing southwards.

In yet another embodiment of the present invention, reflectors are fitted on the top edge and bottom edge so as to form a V-trough configuration, with the angles of the two reflectors with respect to the vertical plane being adjusted suitably 12 times a year as per pre-defined geometric formula.

In yet another embodiment of the present invention, for a 1 m$^2$ of top glass area, the basin volume was 18 L and the spacing between the water surface and the glass was kept to a minimum.

In yet another embodiment of the present invention, fresh stock of saline water is fed into the still each morning and such water is pre-heated the previous day and thereafter stored in an insulated tank to keep it warm.

In yet another embodiment of the present invention, stainless steel condensers are fitted onto three sides of the still.

In yet another embodiment of the present invention, saline water is allowed to flow over the condenser at the rate of 150 to 300 mL per minute, collected in a sump, cooled during the night and then poured into an insulated tank from which it could flow by gravity over the condenser during the day, especially during the period of the day when productivity is highest.

In yet another embodiment of the present invention, the top glass assembly was designed to be detachable for easy cleaning of the still interior.

The improved solar still as claimed in claim 1, wherein teflon corks attached to the lower part of the basin drains out the concentrate prior to feeding of fresh stock of saline water. The improved solar still as claimed in claim 1, wherein said solar still is effective as a household desalination device requiring no sophistication and using only seawater and solar energy to provide drinking water also utilized to concentrate juices, coconut water, etc. and also for recovering distillates of medicinal value such as distillate from cow's urine.

The improved solar still as claimed in claim 1, wherein when seawater is used as feed water, such water is preferably clarified and deodorized by known methods prior to charging into the still.

The improved solar still as claimed in claim 1, wherein a suitable dye can be optionally added into the feed water to enhance solar absorption, especially when the solar insolation is sub-optimal.

In an embodiment of the present invention, said solar still give up a maximum of 7.265 L of distilled product water with 40.36% recovery from seawater feed, when the average insolation over 7 hours was 972.35 $Wm^{-2}$, the ambient temperature was 31.62° C. and the wind speed was 0.83 $ms^{-1}$.

In another embodiment of the present invention, concentrate in the still was discarded every day.

Figure 2:
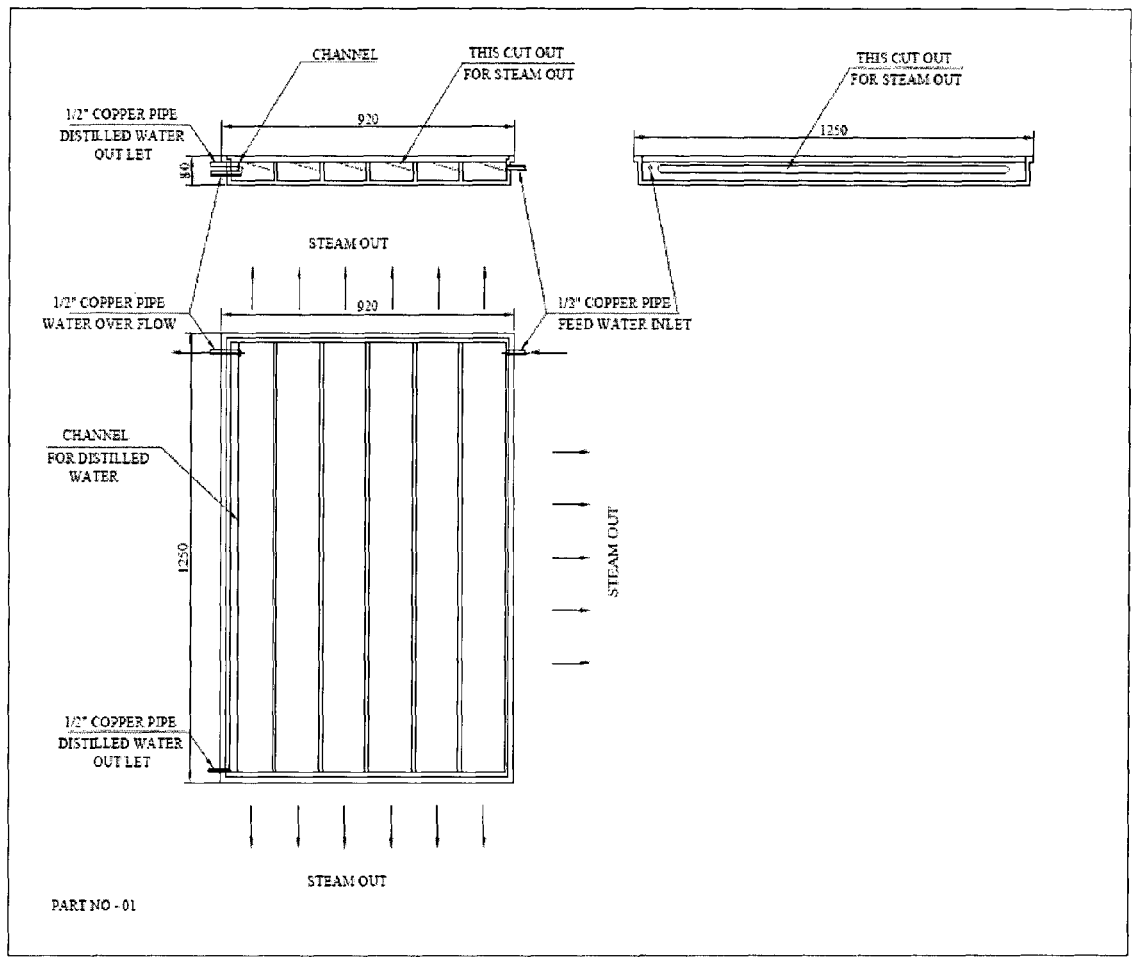
FIG. 2 represents the solar still basin.
Figure 3:
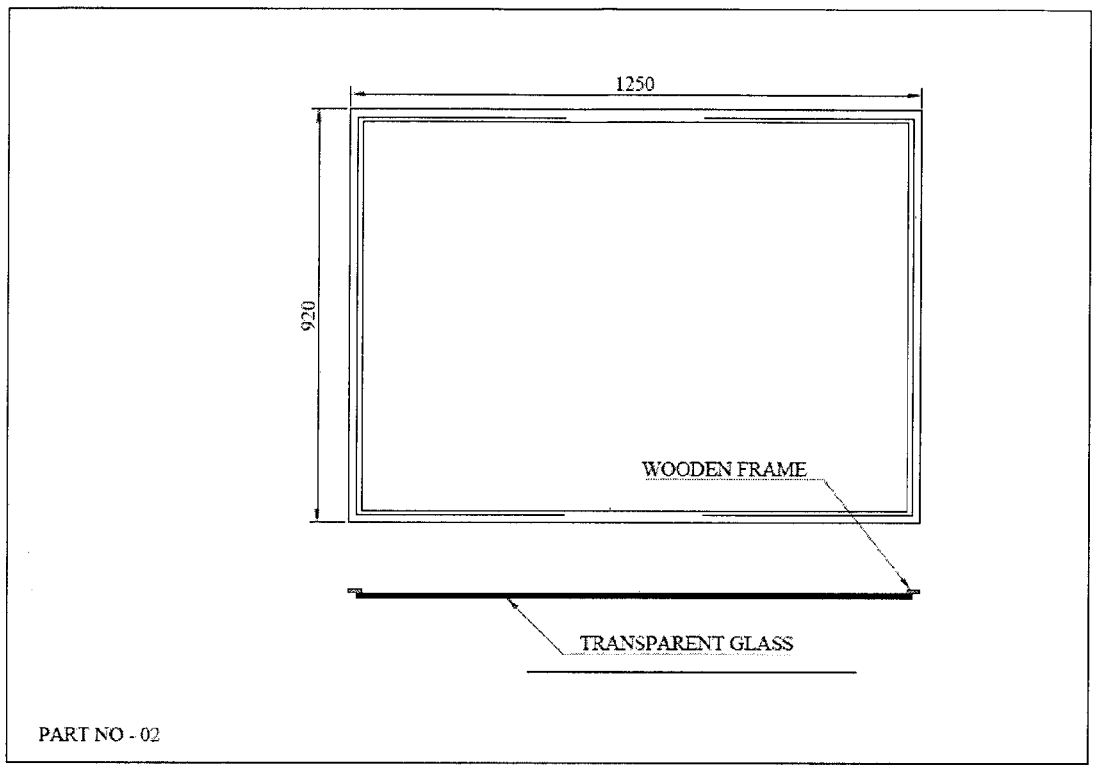
FIG. 3 represents the top glass assembly of the solar still.
Figure 4:
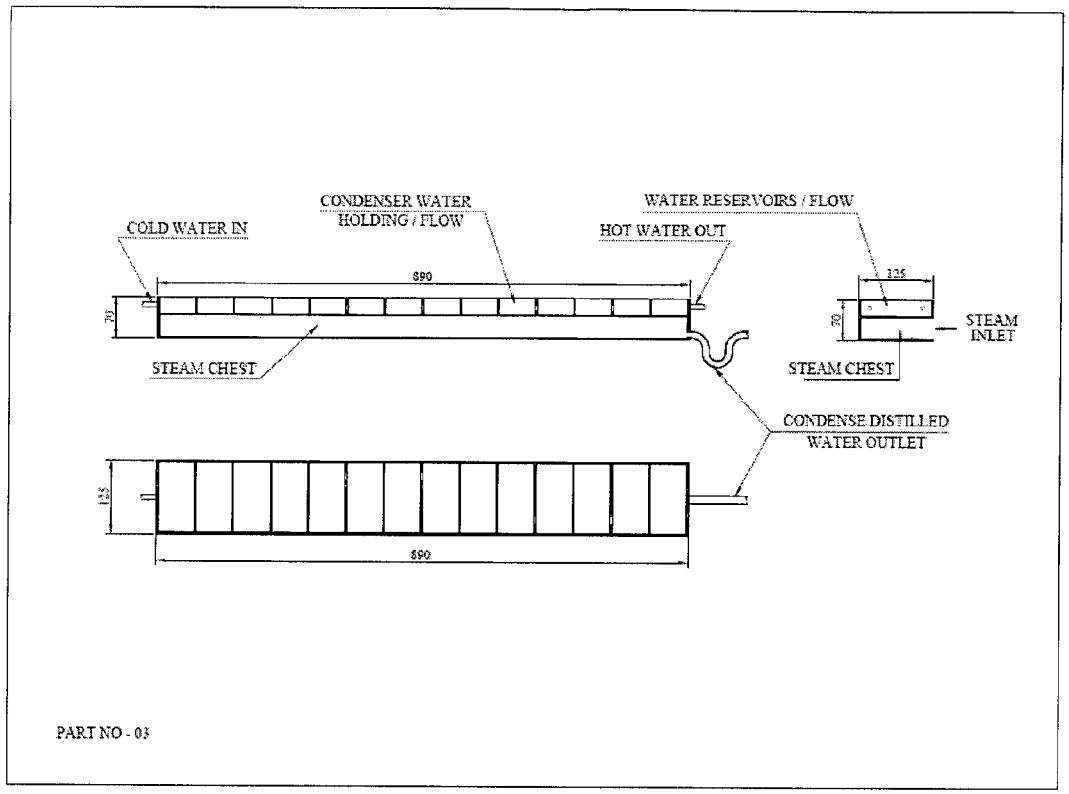
FIG. 4 represents the side condensers.
Figure 5:
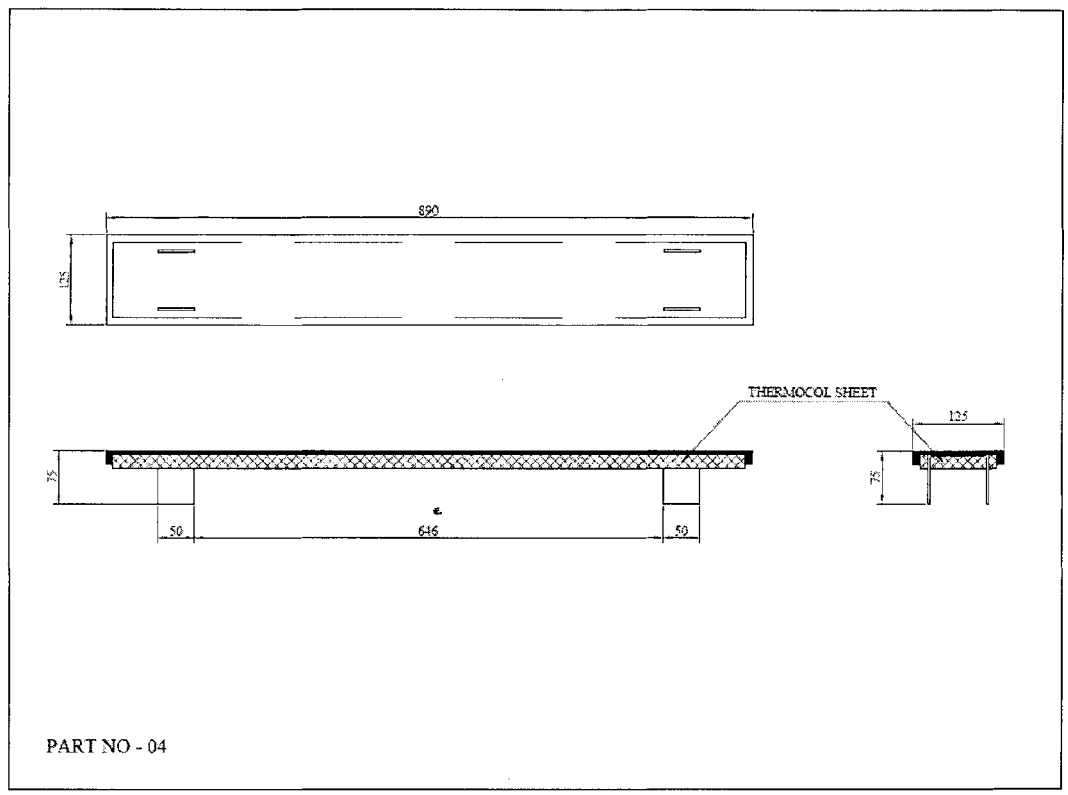
FIG. 5 represents the condenser cover.
Figure 6:
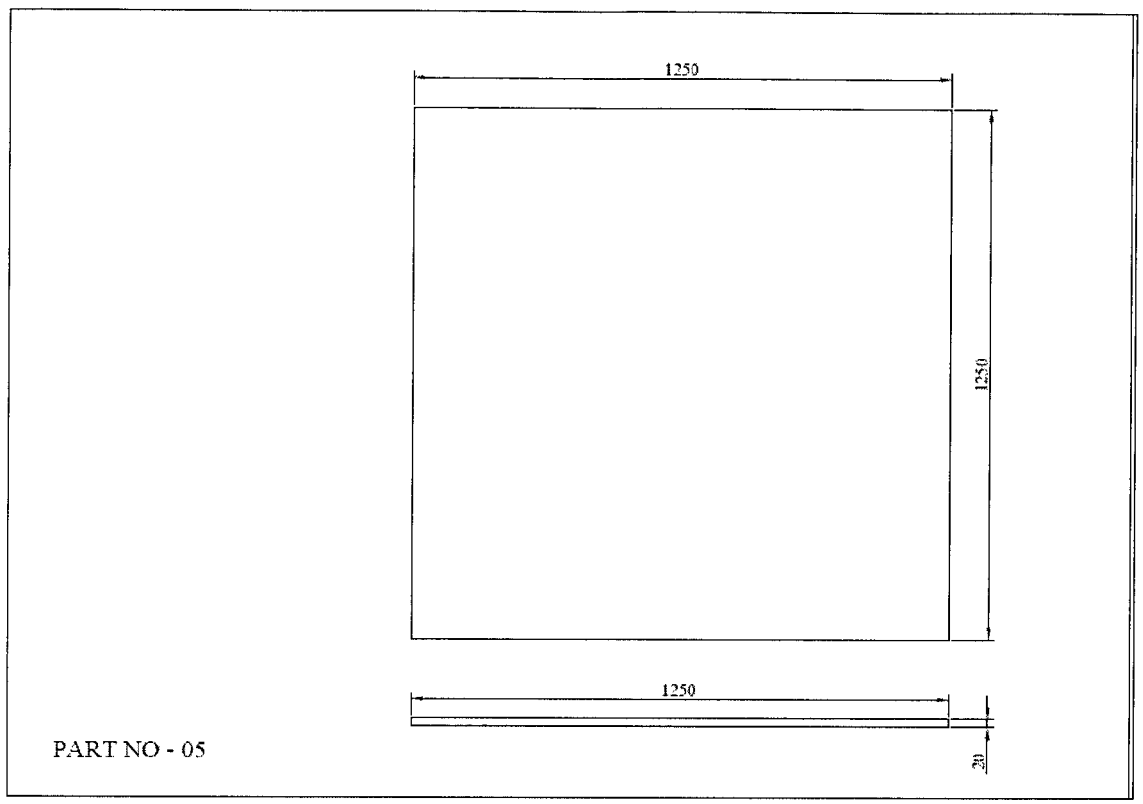
FIG. 6 represents the reflectors.
Figure 7:
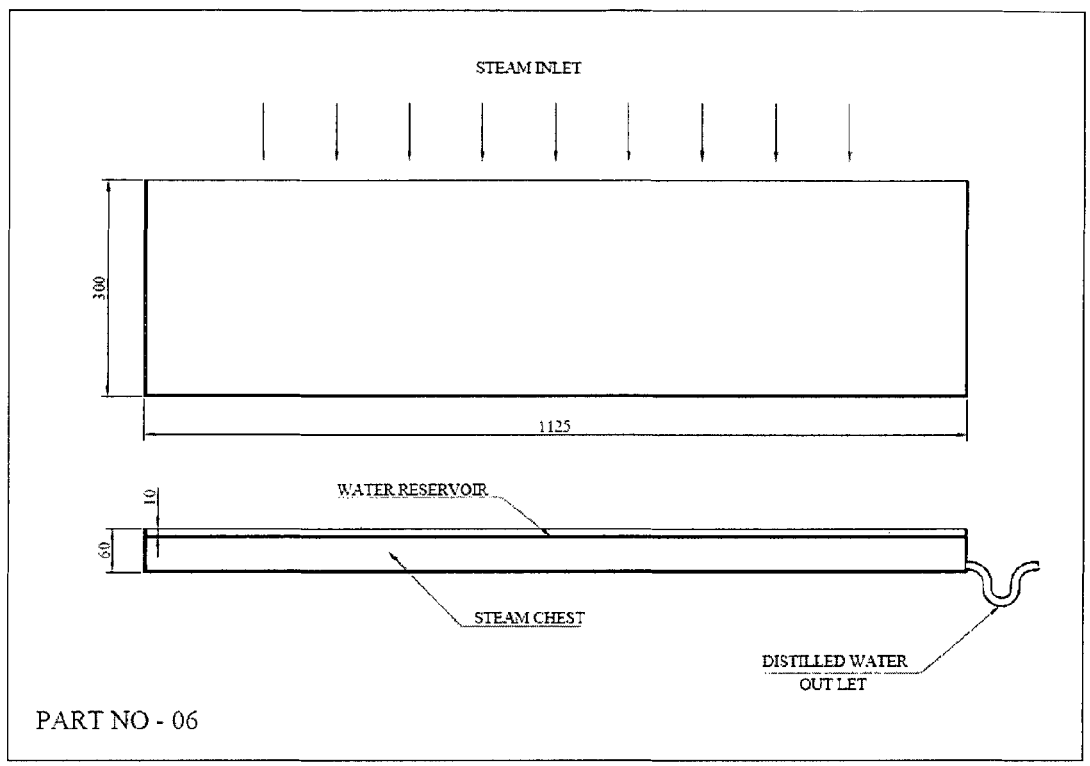
FIG. 7 represents the backside condenser.
Figure 8:
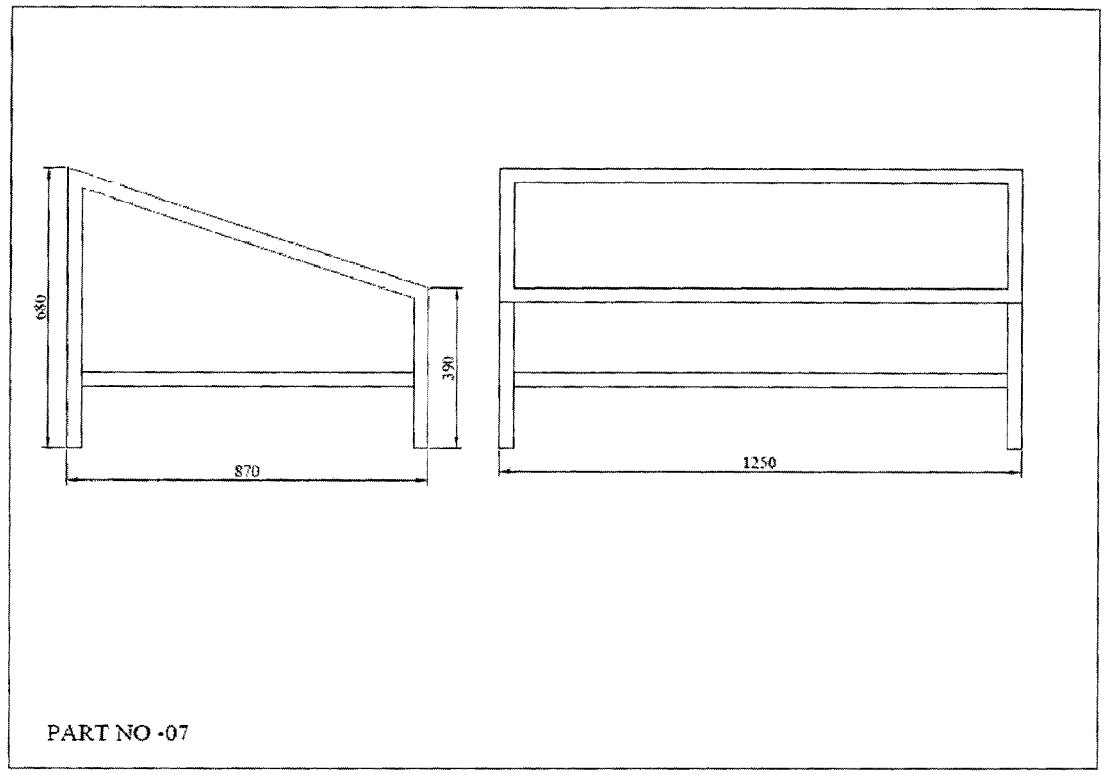
FIG. 8 represents the supporting structure.
Figure 9:
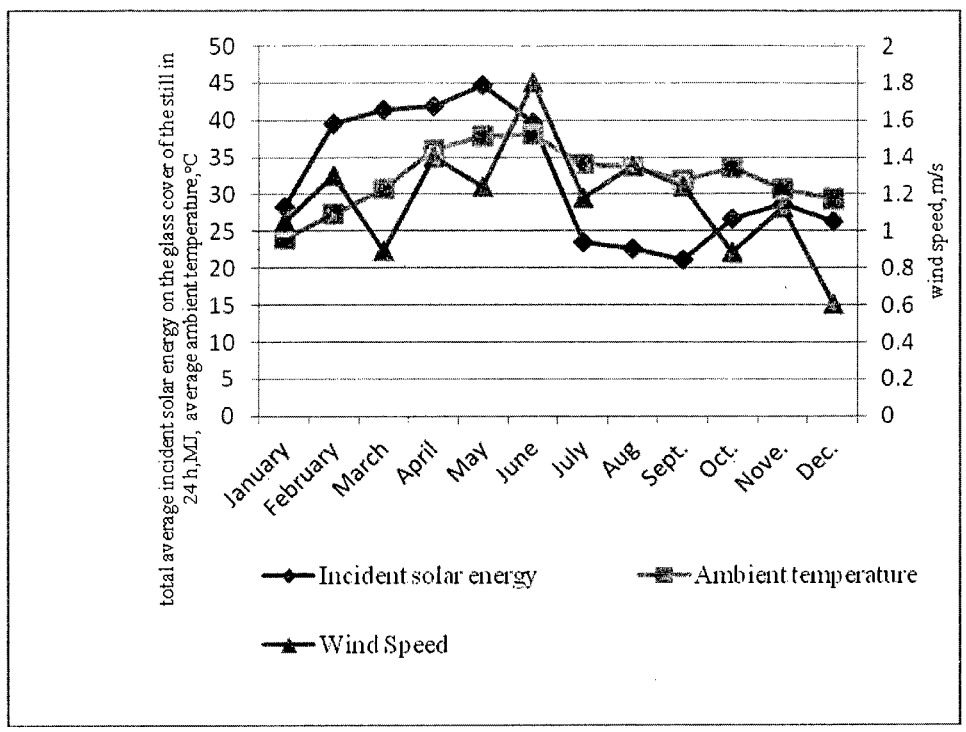
FIG. 9 represents variation of solar insolation, wind speed and ambient temperature on the days of experiment
Figure 10:
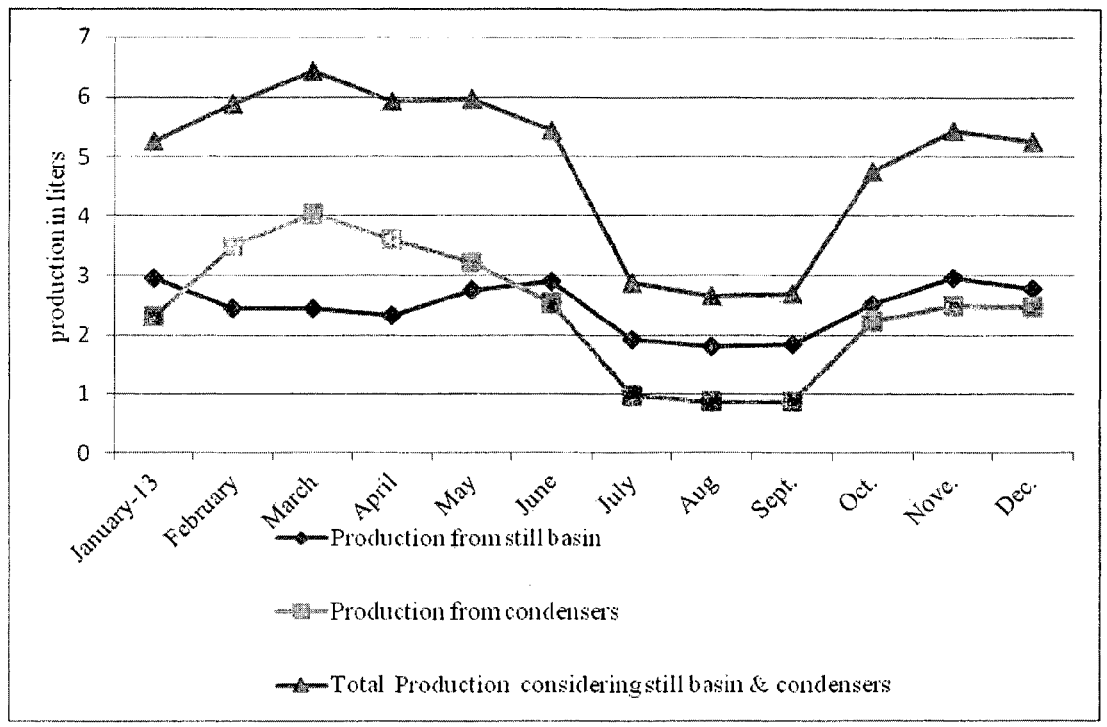
FIG. 10 represents the average productivity from the solar still for each month in a year
Figure 11:
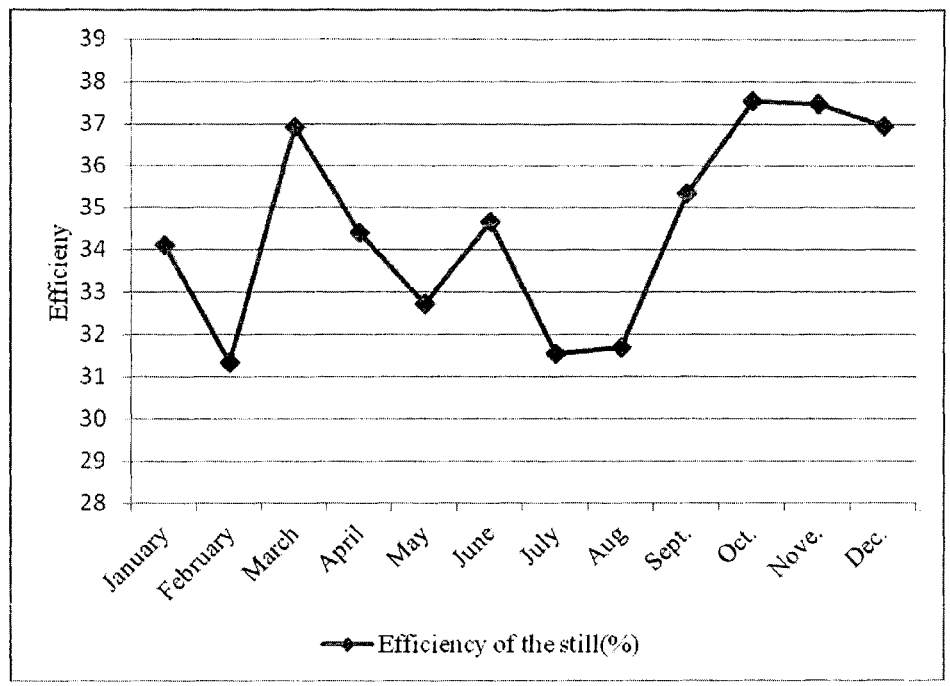
FIG. 11 represents the variation of efficiency of the solar still for a year.

In an embodiment of the present invention, the improved solar still of FIGS. 1-8 has a capacity of holding 18 l of saline water.

In another embodiment of the present invention, the absorber basin of the solar still of FIGS. 1-8 had an angle of 20° to the horizontal.

In another embodiment of the present invention, reflectors attached to the solar still of FIGS. 1-8 raised the insolation on the collector by 40-50% as compared to the unit without reflectors.

In another embodiment of the present invention, the solar still of FIGS. 1-8 had side and back metallic condensers attached to the basin such that they were an extended part of the basin forming steam chests.

In another embodiment of the present invention, the solar still of FIGS. 1-8 the upper part of the condensers had arrangements to flow water under gravity at a specified flow rate to keep the condensers cool.

In another embodiment of the present invention, the solar still of FIGS. 1-8, the cooling water from the condensers were collected in a sump and poured back to a tank placed at the back of the still.

In another embodiment of the present invention, the 200 liter tank where to water was stored was insulated using hollow PVC sheets and thermocol strips were inserted within the hollow channels.

In another embodiment of the present invention cover of the solar still was made using toughened glass to avoid breakage.

In another embodiment of the present invention the cover glass was fitted to detachable teakwood frame positioned on the still over a rubber gasket strip so as to facilitate daily cleaning.

In another embodiment of the present invention metal threaded teflon stoppers were attached on the bottom of the basin of the still to flow out the used water so as to facilitate daily cleaning.

In another embodiment of the present invention, there are four outlets from solar still-three from the three condensers and the fourth from the still basin. This was to ascertain the volume of distillate from the condensers and the basin separately.

In another embodiment of the present invention, the insulated tank is left open during night to obtain cooled water through night sky radiative cooling.

In another embodiment of the present invention the next day's feed water is heated up by solar radiation and put it into a separate tank where it is kept warm.

DETAILED DESCRIPTION OF THE INVENTION

The invention discloses the design of a household solar distillation unit or still with enhanced output and high recovery even with seawater as feed for drinking water production as per the FIGS. 1-8 (vide infra). Another useful element of design is easy maintenance of the unit. The output and recovery are enhanced by (i) aligning the top glass and basin so as to maximise the input solar radiation, (ii) using N-S reflectors in V trough configuration to further raise the incident radiation, (iii) minimising the gap between the water surface in the basin and the top glass cover, (iv) employing metallic condensers on three sides to maximise condensation efficiency, (v) using suitably heated and cooled saline water by taking advantage of ambient temperature differential during a day and using such water as feed water and condenser water respectively, and (vi) optionally adding a dye to further raise the feed water temperature. Use of detachable top glass assembly and teflon cork at the bottom allow for easy cleaning of the interior of the still and discharge of concentrate, respectively. The still is also demonstrated to be useful for other applications where, besides producing distilled water, the concentrate is a more value added product than the feed.

The construction of the household solar distillation unit for drinking water production with its parts numbered from (1) to (7) is as shown in FIG. 2 to FIG. 8 laid out in sheet 01 to sheet 07. Reflectors (05), 1.2 m×1.2 m made of anodized aluminum sheets (0.0005 m), were attached on 0.019 m PVC sheet and fixed on the North-South edges of the still. The angle of the reflectors could be changed according to the seasonal movement of the sun. The reflector angles throughout the year can be summarized in Table 1. The average declination and duration for a given average declination is given in Table 2.

TABLE 1

Angle of the reflectors for solar still with respect to vertical plane

| Number of time interval | From | To | Optimized day in the specific time period | Angle of North side reflector | Angle of South side reflector |
|---|---|---|---|---|---|
| 1 | November | 6 February | 2 Nov 19 or Jan 21 | −9 | 60 |
| 2 | February | 3 February | 23 Feb 14 | −4 | 56 |
| 3 | February | 24 March | 12 Mar 5 | +1 | 51 |
| 4 | March | 13 March | 29 Mar 22 | 6 | 46 |
| 5 | March | 30 April | 15 Apr 8 | 11 | 42 |
| 6 | April | 16 May | 6 Apr 26 | 16 | 36 |
| 7 | May | 7 August | 4 May 20 or July 23 | 20 | 31 |
| 8 | August | 5 August | 25 Aug 16 | 16 | 36 |
| 9 | August | 26 September | 11 Sep 4 | 11 | 42 |
| 10 | September | 12 September | 28 Sep 20 | 6 | 46 |
| 11 | September | 29 October | 15 Oct 7 | 1 | 51 |
| 12 | October | 16 November | 5 Oct 26 | −4 | 56 |

TABLE 2

Duration for a given average declination in days

| Number of time interval | From | | To | | Average Declination | Duration for a given average declination (Days) |
|---|---|---|---|---|---|---|
| 1 | November | 6 | February | 2 | −20.1 | 89 |
| 2 | February | 3 | February | 23 | −13.4 | 21 |
| 3 | February | 24 | March | 12 | −6.7 | 17 |
| 4 | March | 13 | March | 29 | 0 | 17 |
| 5 | March | 30 | April | 15 | 6.7 | 17 |
| 6 | April | 16 | May | 6 | 13.4 | 21 |
| 7 | May | 7 | August | 4 | 20.1 | 90 |
| 8 | August | 5 | August | 25 | 13.4 | 21 |
| 9 | August | 26 | September | 11 | 6.7 | 17 |
| 10 | September | 12 | September | 28 | 0 | 17 |
| 11 | September | 29 | October | 15 | −6.7 | 17 |
| 12 | October | 16 | November | 5 | −13.4 | 21 |

The solar still assembly consisted of the frame, outer body, inner basin, product water line and the partitions. The frame of the solar still unit was made using solid teak wood. The outer body of the unit was made of 0.012 m marine plywood. The basin had dimensions 1.2 m×0.85 m×0.05 m. Product water line was made using PVC channel. The inner basin surfaces had black fibre re-enforced plastic to absorb the maximum amount of solar radiation incident and to make the basin completely leak-proof. The total basin had 5 partitions. The dimensions were 1.2 m×0.012 m×0.05 m. A jacket of 0.006 m plywood was positioned at the sides and bottom of the still and the annular space was filled with sawdust. The unit was oriented facing south and tilted at 20° to the horizontal. This inclination was to maximise solar irradiation on the glass cover. The cover material or glass assembly (02) was 0.006 m toughened commercial glass which was fixed to a teakwood frame positioned on the still over a rubber gasket strip. The cover could be removed easily for cleaning purposes. Metal threaded (hole of diameter 0.025 m) teflon stoppers were attached on the bottom of the basin of the still to flow out the used water.

The condensers (03 & 06) on both the sides and the back were made using aluminum sheets of 0.001 m thickness. The size of each condenser was 0.9 m×0.109 m×0.05 m. A tray above the condenser (04) had a depth of 0.028 m. To facilitate steam condensing on the inner top surface of the condenser, cold water was allowed to flow over the outer surface. The water flowing out was collected in a sump during the day time and stored. In the evening the water was transferred to an insulated tank (1.01 m×0.50 cm×0.04 m) positioned behind the still. The tank was kept open to atmosphere at night to facilitate night sky radiative cooling.

The main inventive steps are the following:
1. North-South reflectors with slotted arrangement for seasonal adjustment which enhances the incident radiation on the still over a day;
2. Covered side condensers and/or condenser positioned in the shadow of the reflector over which cooled water flows by gravity at a specified rate leading to marked lowering of glass temperature and concomitant rise in productivity.
3. Obtaining such cooled water through night sky radiative cooling especially in arid and semi arid locations and keeping the water cool during daytime by placing it in a raised insulated tank;
4. Detachable leak proof glass assembly and teflon corks at the bottom of the still enabling easy maintenance;
5. Daily changing of feed water to avoid scale formation especially when water is brackish/hard;

EXAMPLES

The following examples are given by way of illustration and therefore should not be construed to limit the scope of the present invention.

Examples

In the examples, I(t) is the solar intensity, $T_g$ is the top glass cover temperature, $T_w$ represents the water temperature inside the solar still basin, $T_a$ represents the ambient temperature and W.S is the ambient wind speed.

Example 1

Effect of Tilt

Table 1 shows the enhancement of solar radiation on a surface tilted at an angle of 20° to horizontal and kept facing south.

TABLE 3

The effect of tilt

| | Without reflectors | With reflectors (at optimized angle) |
|---|---|---|
| Date of experiment | 30 Nov. 2012 | 11 Dec. 2012 |
| Solar energy falling on a surface tilted at an angle of 20° to horizontal facing exact south for 7 sunny hrs, $MJm^{-2}$ | 19.62 | 29.72 |
| Solar energy falling on horizontal surface for 7 sunny hrs, $MJm^{-2}$ | 15.67 | 15.19 |

The above example teaches us that the incident solar radiation is higher for a tilted surface facing south. The effect of the tilt is more pronounced with the use of North-South reflectors. Accordingly, the top glass surface is maintained in tilted position as optimum alignment.

Example 2

Effect of Partitions/Steps

Two stills were constructed in which in both cases the top glass surface was tilted 20° N-S. In one of the stills the black colored basin was kept horizontal while in the other still the basin was tilted at 20° N-S and 5 partitions used to hold the water in the tilted basin. The outer dimensions and material of construction were kept the same for both the stills. Also, similar insulation at the sides and bottom were applied to both. The horizontal still held 20 L of seawater whereas the still with tilted basin held 18 L. Data for two days are presented in Table 4. It can be seen that tilting the basin in desired orientation has a dramatic effect on the product water output from the still.

TABLE 4

The effect of water in tilted basin with incorporation of steps on productivity of the still

| | Horizontal basin | Tilted basin |
|---|---|---|
| Date of experiment | 3 Dec. 2012 | 3 Dec. 2012 |
| Average I(t) on glass surface | 824.88 | 824.88 |

TABLE 4-continued

The effect of water in tilted basin with incorporation
of steps on productivity of the still

|  | Horizontal basin | Tilted basin |
|---|---|---|
| for 7 sunny hrs, $Wm^{-2}$ | | |
| Max. $T_g$, ° C. | 43.7 | 55 |
| Max. $T_w$, ° C. | 47.2 | 66 |
| Avg. $T_a$, ° C. | 31.9 | 31.9 |
| AvgW.S, $ms^{-1}$ | 0.4 | 0.4 |
| Production, l | 0.554 | 2.467 |

This example shows us that the advantage of a stepped solar still as claimed in the prior art is in effect an outcome of proper alignment of the basin so that maximum radiation falls on it and while enabling the water to be retained uniformly on the basin.

Example 3

Enhanced Output through North-South Reflectors in V-Trough Alignment

Reflectors were added on the north-south edges of the still with tilted basin in proper alignment according to Table 1. Data were compared against another similar still without such reflectors.

TABLE 5

The effect of North -South reflectors on still with tilted basin

|  | Without N-S reflector | With N-S reflector |
|---|---|---|
| Date of experiment | 29 Nov. 2012 | |
| Average I(t) on horizontal surface for 7 sunny hrs, $Wm^{-2}$ | 643.62 | |
| Average I(t) on glass surface for 7 sunny hrs, $Wm^{-2}$ | 792.62 | 1221.19 |
| Max. $T_g$, ° C. | 54 | 78.8 |
| Max. $T_w$, ° C. | 59 | 89 |
| Avg. $T_a$, ° C. | 28 | |
| AvgW.S, $ms^{-1}$ | 0.7 | |
| Production, l | 2.536 | 5.115 |

This example teaches us that the output increases considerably upon incorporation of reflectors due to the increase in incident solar radiation.

Example 4

Enhanced Output though Attachment of Condenser on the Still of Example 3

Table below shows the variation of the maximum glass and water temperatures achieved and also the distilled water production from the stills due to the presence of condensers. Four days with different ambient conditions have been compared.

TABLE 6

The effect of condensers on productivity

|  | Without condenser | With condenser | Without condensers | With condensers | Without condenser | With condenser | Without condensers | With condenser |
|---|---|---|---|---|---|---|---|---|
| Date of experiment | 14 Mar. 2012 | | 21 Jun. 2012 | | 12 Dec. 2012 | | 19 Feb. 2013 | |
| Average I(t) on glass surface for 7 sunny hrs, $Wm^{-2}$ | 1411.6 | 1422.39 | 1107.52 | 1102.15 | 1262.67 | 1280.64 | 1502.30 | 1502.30 |
| Max. $T_w$, ° C. | 93 | 77 | 87 | 73 | 93 | 74 | 81 | 77 |
| $T_g$, ° C. $T_w$,max | 87 | 58 | 78 | 62 | 84 | 64 | 75.2 | 66.6 |
| Avg. $T_a$, ° C. | 30.5 | | 39 | | 30 | | 25 | |
| Avg W · S, $ms^{-1}$ | 0.5 | | 1 | | 0.3 | | 0.7 | |
| Production, l | 4.717 | 7.062 | 4.421 | 5.306 | 5.440 | 6.272 | 4.067 | 6.750 |

This example teaches us that although in all cases the output increases upon incorporation of condenser, the magnitude of the effect is most pronounced when the incident radiation is highest and, consequently, rate of evaporation is higher and for which use of condenser is most advantageous to minimize vapor loss. In the best result obtained, the product water recovery was 39.2% with respect to feed water taken.

Example 5

Enhanced Output from the Still of Example 4 through Addition of Black Ink into Feed Water To check the effect of a black pigment on the productivity of the still, black ink @0.1% was added to the feed water. The data are summarized in the table below.

TABLE 7

The effect of black ink in feed water on productivity

|  | Without black ink | With 0.1% black ink | Without black ink | With 0.1% black ink |
|---|---|---|---|---|
| Date of experiment | 18 Feb. 2012 | 1 Mar. 2012 | 17 Feb. 2012 | 3 Mar. 2012 |
| Average I(t) on horizontal surface for 7 sunny hrs, $Wm^{-2}$ | 763.4 | 767.6 | 752.6 | 750.2 |
| Max $T_w$, ° C. | 66 | 70 | 62 | 66 |
| Max $T_g$, ° C. | 60 | 58 | 58 | 58 |
| Avg $T_a$, ° C. | 26.3 | 26.12 | 25.2 | 26.0 |
| Avg W.S $ms^{-1}$ | 0.7 | 0.8 | 0.4 | 0.3 |
| Production l | 5.493 | 6.424 | 5.322 | 6.053 |

The above example teaches us, that the output can be raised by ca. 10% through incorporation of black ink in the feed water. The product water had no trace of colour. The reject stream can be decolorized prior to discharge. The addition of ink is most useful when the solar insolation is sub-optimal.

Example 6

Considering the year from January 2012 to 2013, the solar still with the condensers and North-South reflectors gave a maximum of 7.265 L of distilled product water with 40.36% recovery from seawater feed, when the average insolation over 7 hours was 972.35 $Wm^{-2}$, the ambient temperature was 31.62° C. and the wind speed was 0.83 $ms^{-1}$.

| Date of experiment | 22 Mar. 2012 |
|---|---|
| Average I(t) on horizontal surface for 7 sunny hrs, $Wm^{-2}$ | 972.35 |
| Average I(t) on glass surface for 7 sunny hrs, $Wm^{-2}$ | 1517.66 |
| Max. $T_g$, ° C. | 66 |
| Max. $T_w$, ° C. | 75 |
| Avg. $T_a$, ° C. | 31.62 |
| AvgW.S, $ms^{-1}$ | 0.83 |
| Production, l | 7.265 |

Advantages of the Invention

The main advantage of the present invention is:
1. Systematic enhancement in solar still efficiency for desalination through incorporation of the features according to the present invention.
2. As the unit has north-south reflectors, the tracing of the reflectors can be done manually 12 times in a year.
3. The unit is most suitable for desalination of highly brackish water or even seawater which is less amenable through other means of desalination at household scale.
4. By pre-heating the feedwater on the day before and subsequently storing the hot water in a Styrofoam box, product output can be further enhanced.
5. Similarly, by allowing feedwater to cool during the night and thereafter filling it in manually in an insulated tank, one can have gravity fed cool water flowing over the condenser to aid the condensation process.
6. Up to 7.0-7.2 L of product water could be obtained under favorable conditions with 35-40% product water recovery from seawater.

We claim:
1. A household solar still for desalination of brackish water comprising:
a frame;
a tilted water basin having five partitions for holding water in a tilted position;
a tilted top glass assembly positioned over the tilted water basin, the tilted water basin and the tilted top glass assembly being tilted at an angle in the range of 18.9 to 20° to the horizontal with a top portion of the tilted top glass assembly pointing northwards and a bottom portion of the tilted top glass assembly pointing southwards, the tilted top glass assembly being fixed to the frame;
a pair of a top reflector and a bottom reflector, the top reflector being fixed to a top edge of the solar still and the bottom reflector being fixed to a bottom edge of the solar still, each of the reflectors being in the form of anodized aluminium sheets, attached to a polymeric sheet;
a first and a second metallic condenser being attached on eastward and westward sides of the solar still, the first metallic condenser being covered by a first tray, and the second metallic condenser being covered by a second tray;
a third metallic condenser being attached to a back side of the solar still, the third metallic condenser being positioned so as to be substantially covered by the shadow of the reflector;
each of the first and second metallic condensers comprise a lower steam chest part and an upper part;
the lower steam chest part comprises a steam inlet and a condensed water outlet; and
the upper part comprises a cold water inlet, a hot water outlet and a water holding/flow portion located between the cold water inlet and the hot water outlet, wherein the upper part is adapted to receive brackish water and to allow flow to the brackish water under gravity at a specified flow rate over the lower steam chest part to facilitate condensing of steam on an inner top surface of the lower steam chest part.
2. The solar still as claimed in claim 1, wherein the pair of the top and the bottom reflectors form a V-trough configuration and the angles of the two reflectors with respect to the vertical plane are optimized using geometric formula according to the position of the sun to have maximum solar energy on the tilted top glass assembly helping in maximizing evaporation.
3. The solar still as claimed in claim 1, wherein for a square meter of top glass assembly area, a tilted water basin volume is 18 L.
4. The solar still as claimed in claim 1, wherein the first, second and third metallic condensers are corrosion resistant.
5. The solar still as claimed in claim 1, wherein the first, second and third metallic condensers further comprise a sump and an insulated tank with a removable cover positioned behind the solar still, that cools the brackish water through night sky radiation to produce a cooled brackish water and the cooled brackish water flows over the first, second and third metallic condensers by gravity at an optimum rate and collects in the sump.
6. The solar still as claimed in claim 1, wherein the tilted top glass assembly is designed to be detachable to enable cleaning of a solar still interior and discarding of the concentrate every day prior to feeding of fresh stock of brackish water through leakproof plugs attached to a lower part of the tilted water basin.

7. The solar still as claimed in claim 1 comprising brackish water and an edible dye added to the brackish water.

\* \* \* \* \*